United States Patent
Ma et al.

(10) Patent No.: US 7,349,311 B2
(45) Date of Patent: Mar. 25, 2008

(54) METHOD AND APPARATUS FOR DETECTING RADIAL TILT

(75) Inventors: Byung-in Ma, Gyeonggi-do (KR); Kwan-joon Kim, Gyeonggi-do (KR); In-sik Park, Gyeonggi-do (KR); Byoung-ho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 10/617,256

(22) Filed: Jul. 11, 2003

(65) Prior Publication Data

US 2004/0057351 A1 Mar. 25, 2004

(30) Foreign Application Priority Data

Jul. 11, 2002 (KR) .................. 10-2002-0040401

(51) Int. Cl.
*G11B 7/00* (2006.01)

(52) U.S. Cl. .................. 369/53.19; 369/44.32
(58) Field of Classification Search .......... None
See application file for complete search history.

(56) References Cited

U.S. PATENT DOCUMENTS

| 6,167,009 | A * | 12/2000 | Nakamura et al. ....... 369/44.32 |
| 6,507,544 | B1 | 1/2003 | Ma et al. |
| 6,781,930 | B2 * | 8/2004 | Fukumoto ............... 369/44.32 |
| 2002/0041542 | A1 * | 4/2002 | Sano et al. ............... 369/44.23 |

FOREIGN PATENT DOCUMENTS

| EP | 1085509 A2 * | 3/2001 |
| JP | 2000 48381 | 2/2000 |
| JP | 2001-110074 | 4/2001 |

\* cited by examiner

*Primary Examiner*—William Korzuch
*Assistant Examiner*—Tawfik Goma
(74) *Attorney, Agent, or Firm*—Stein, McEwen & Bui, LLP

(57) ABSTRACT

A method of, and an apparatus for detecting a radial tilt of a disc. Phases of summed signals obtained from signals that external light-receiving units of an octant photo diode receive are compared to generate an external phase comparison signal Do. Phases of other summed signals obtained from other signals, that internal light-receiving units of the octant photo diode receive, are compared to generate the internal phase comparison signal Di. The radial tilt is detected based on the internal and external phase comparison signals Di and Do obtained when a laser beam crosses a track formed the disc. Thus, the radial tilt can be more precisely detected.

18 Claims, 9 Drawing Sheets

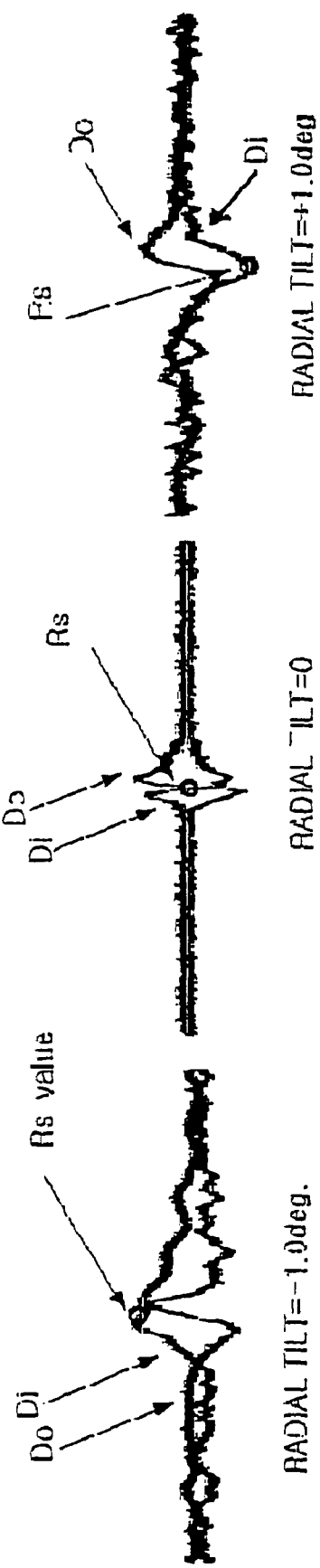

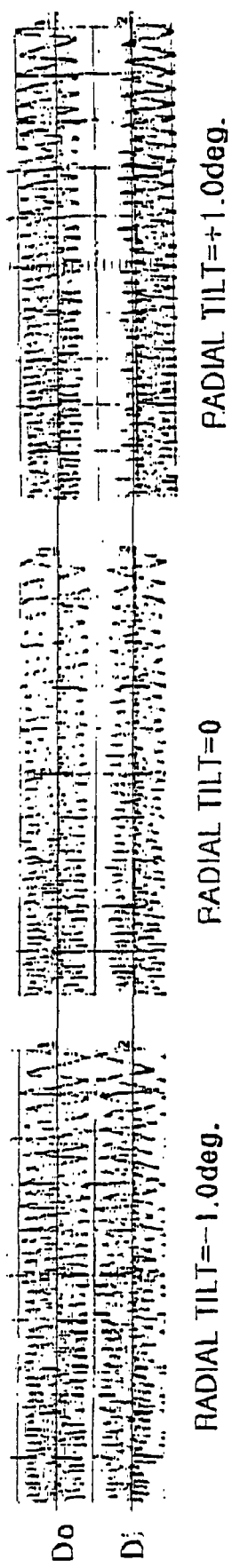

METHOD AND APPARATUS FOR DETECTING RADIAL TILT

CROSS-REFERENCE TO RELATED APPLICATION

This application claims the benefit of Korean Patent Application No. 2002-40401, filed on Jul. 11, 2002, in the Korean Intellectual Property Office, the disclosure of which is incorporated herein by reference.

BACKGROUND OF THE INVENTION

1. Field of the Invention

The present invention relates to a method of, and an apparatus for, detecting radial tilt of a disc.

2. Description of the Related Art

Tilt, which is a reference value representing tilt of a disc, is classified into a radial tilt and a tangential tilt. The radial tilt represents a tilt of the disc in a radial direction thereof, and the tangential tilt represents a tilt of the disc in a circumferential direction thereof. The tilt can be measured from an angle between an incident direction and a reflected direction of a laser beam which is perpendicularly incident on a disc surface. Thus, the tilt is expressed by an angle. In the case of DVDs, the radial tilt should be 0.8 degree or less, and the tangential tilt should be 0.3 degree or less.

A disc drive has a control system which moves a laser beam spot to a target track by maintaining the laser beam on a recording surface of the disc, a control system which moves a laser beam spot to follow a target track by maintaining the laser beam on a recording surface of the disc, and a control system which rotates the disc. The control systems are called a focusing and seek servo control system, a tracking servo control system, and a rotating servo control system, respectively.

The accurate detection of the radial tilt of the disc is important to the operation of these servo control system, since precise servo control may be performed when the radial tilt is accurately detected resulting in smooth reproducing and recording of the disc.

SUMMARY OF THE INVENTION

The present invention provides a method of, and an apparatus for, efficiently detecting radial tilt.

According to an aspect of the present invention, a method is provided for detecting a radial tilt of a disc. Phases of summed signals a1+c1 and b1+d1 obtained from signals a1, b1, c1, and d1 received by external light-receiving units of an octant photo diode are compared, generating an external phase comparison signal Do. Phases of other summed signals a2+c2 and b2+d2 obtained from other signals a2, b2, c2, and d2 received by internal light-receiving units of the photo diode, are compared, generating an internal phase comparison signal Di. The radial tilt is detected based on the internal and external phase comparison signals Di and Do obtained when a laser beam crosses a track on the disc.

According to another aspect of the present invention, when detecting the radial tilt, a level value Rs of the internal phase comparison signal Di is read when a level value of the external phase comparison signal Do is substantially zero. When detecting the radial tilt, the read value Rs may be multiplied by a proportional constant k to calculate a radial tilt value.

According to another aspect of the present invention, an apparatus is provided for detecting a radial tilt of a disc. The apparatus includes a pickup unit, a phase comparator, and a tilt detector. An octant photo diode is mounted in the pickup unit. The phase comparator compares phases of summed signals a1+c1 and b1+d1 obtained from signals a1, b1, c1, and d1 that external light-receiving units of the octant photo diode receive to generate an external phase comparison signal Do, and compares phases of other summed signals a2+c2 and b2+d2 obtained from signals a2, b2, c2, and d2 that internal light-receiving units of the octant photo diode receive to generate an internal phase comparison signal Di. The tilt detector detects the radial tilt when a laser beam crosses a track on the disc, based on the internal and external phase comparison signals Di and Do generated by the phase comparator.

According to still other aspects of the present invention, a disc drive is provided in which the tilt detector is mounted, and a disc recording/reproducing apparatus in which a disc drive is mounted.

Additional aspects and advantages of the invention will be set forth in part in the description which follows and, in part, will be obvious from the description, or may be learned by practice of the invention.

BRIEF DESCRIPTION OF THE DRAWINGS

These features and/or other aspects and advantages of the invention will become apparent and more readily appreciated from the following description of the embodiments taken in conjunction with accompanying drawings in which:

FIGS. 11A-C illustrate changes in the internal and external phase comparison signals Di and Do according to a radial tilt value changed when a laser beam crosses the track;

FIGS. 12A-12C show the internal and external phase comparison signals Di and Do obtained by the radial tilt when the laser beam repeatedly crosses the track with tracking servo control turned off.

DETAILED DESCRIPTION OF THE INVENTION

Figure 1:
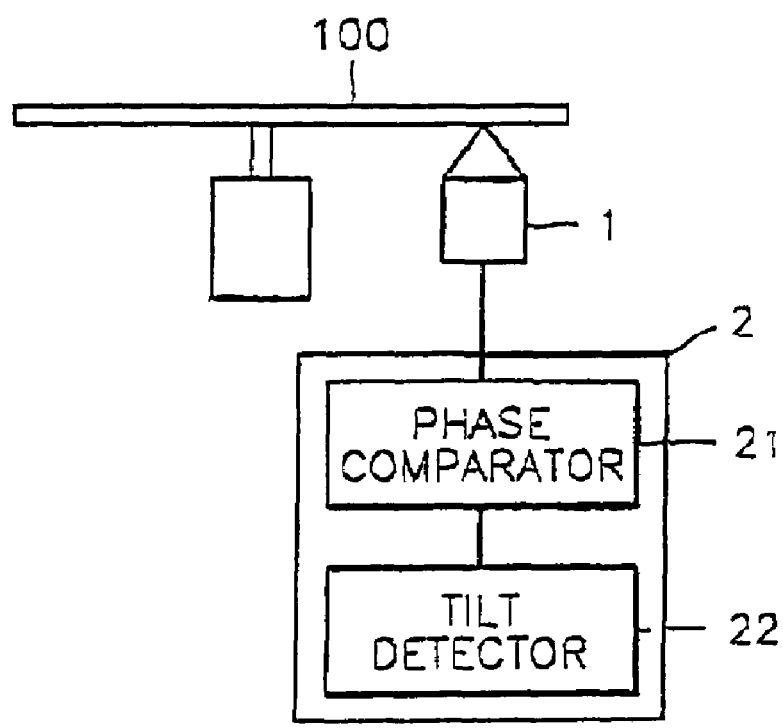
FIG. 1 is a schematic view of a disc drive according to an aspect of the invention.

Reference will now be made in detail to the embodiments of the present invention, examples of which are illustrated in the accompanying drawings wherein like reference numerals refer to the like elements throughout. The embodiments are described below in order to explain the present invention by referring to the figures.

FIG. 1 is a schematic view of a disc drive according to an aspect of the present invention. Referring to FIG. 1, the disc drive includes a pickup unit 1 and a servo controller 2. The pickup unit 1 has a semiconductor laser which radiates a laser beam onto a disc 100 and an octant photo diode as a light-receiving unit which receives the laser beam reflected from the disc 100. The octant photo diode has a plurality of, i.e., eight light-receiving units.

The servo controller 2 includes a phase comparator 21 generating a phase comparison signal based on a signal supplied from the pickup unit 1 and a tilt detector 22 detecting radial tilt based on the phase comparison signal generated by the phase comparator 21. The phase comparator 21 compares phases of summed signals a1+c1 and b1+d1 obtained from signals a1, b1, c1, and d1 that external light-receiving units of the octant photo diode mounted in the pickup unit 1 receive, to generate an external phase comparison signal Do. Also, the phase comparator 21 compares phases of summed signals a2+c2 and b2+d2 obtained from signals a2, b2, c2, and d2 that internal light-receiving units of the octant photo diode receive, to generate an internal phase comparison signal Di. The tilt detector 22 detects the radial tilt based on the external and internal phase comparison signals Do and Di.

Figure 2:
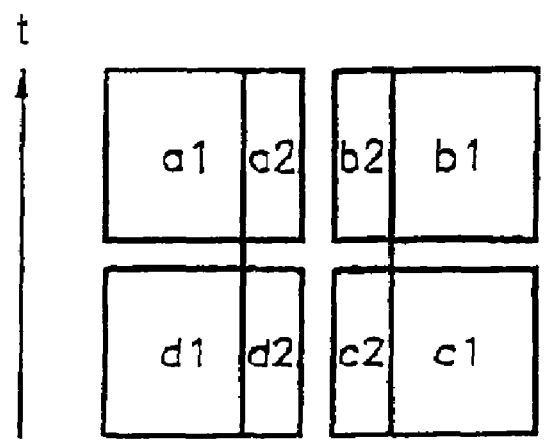
FIGS. 2 and 3 are schematic views of light-receiving surfaces of an octant photo diode that is mounted in a pickup unit 1.
Figure 3:
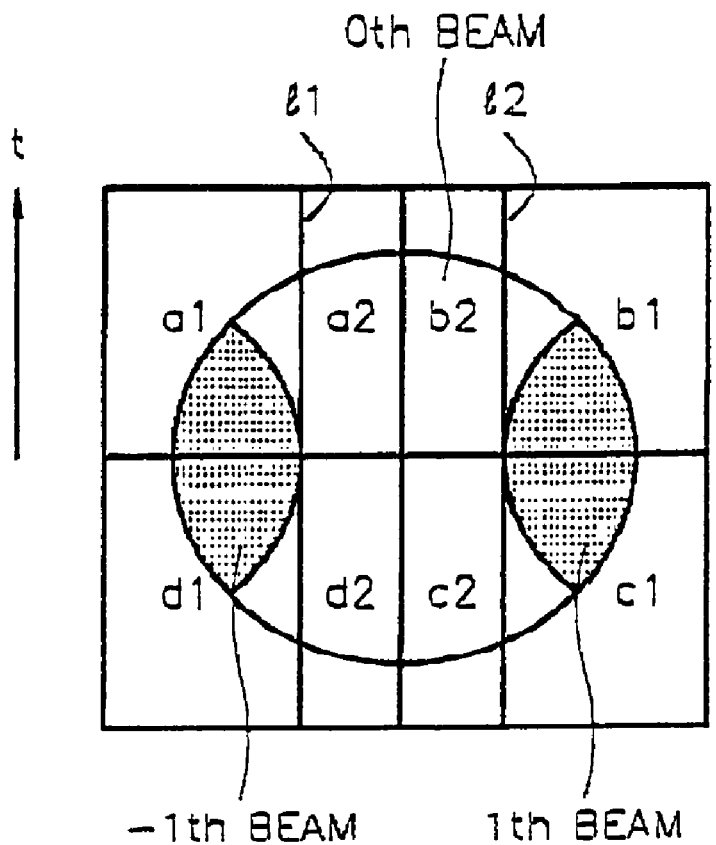

FIGS. 2 and 3 show light-receiving surfaces of the octant photo diode mounted in the pickup unit 1. Referring to FIG. 2, the octant photo diode has eight light-receiving units. The outer light-receiving units are called external light-receiving units and the inner light-receiving units are called internal light-receiving units. The external light-receiving units receive signals a1, b1, c1, and d1, respectively, and the internal light-receiving units receive signals a2, b2, c2, and d2, respectively.

According to one aspect of the invention, the light-receiving surfaces of the external and internal light-receiving units may be rectangular, although other geometries are possible. In one aspect of the invention, the rectangular shapes of the light-receiving surfaces of the internal light-receiving units are all substantially the same and the rectangular shapes of the light-receiving surfaces of the external light-receiving units are all substantially the same. Also, two sides of the light-receiving surfaces of the internal light-receiving units and two sides of the light-receiving surfaces of the external light-receiving units disposed in a track direction (t direction) of the disc are substantially identical. The other two sides of the light-receiving surfaces of the external light-receiving units that are disposed to be perpendicular to the track direction (t direction) of the disc may be longer than the other two sides of the light-receiving surfaces of the internal light-receiving units that are disposed to be perpendicular to the track direction (t direction) of the disc.

Referring to FIG. 3, requirements for forming light-receiving surfaces will now be illustrated. The internal light-receiving units receive none or a portion of a $-1^{st}$-order and $1^{st}$-order light beams of the light beams reflected from the disc 100, and the external light-receiving units receive $0^{th}$-order and $-1^{st}$-order light beams or $0^{th}$-order and $1^{st}$-order light beams. In the embodiment described with reference to FIG. 3, boundary lines l1 and l2 are set so that the internal light-receiving units receive only the $0^{th}$ beam, and not the $1^{st}$-order light beam. However, the boundary lines l1 and l2 may be alternately set so that the internal light-receiving units receive a portion of the $-1^{st}$-order or $1^{st}$-order light beam.

Figure 4:
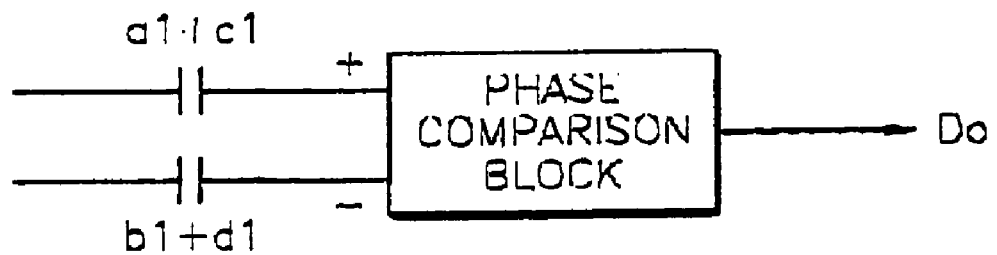
FIGS. 4 and 5 are block diagrams illustrating phase comparison signals generated by a phase comparator 22.
Figure 5:
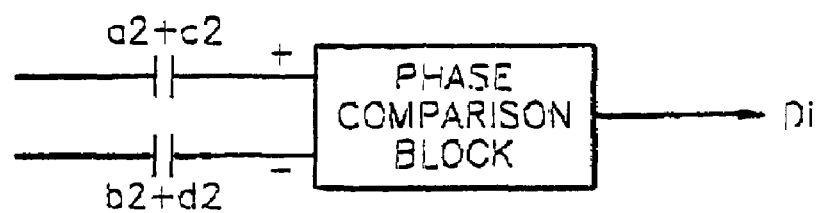

FIGS. 4 and 5 are views showing phase comparison signals generated by the phase comparator 21.

The phase comparator 21 includes a phase comparison block as shown in FIGS. 4 and 5. The phase comparison block produces summed signals of input signals a1, b1, c1, d1, a2, b2, c2, and d2, calculates a difference in AC components between two summed signals, and outputs a phase comparison signal. As shown in FIG. 4, an external phase comparison signal Do is obtained by comparing phases of summed signals a1+c1 and b1+d1 of signals that the external light-receiving units of the octant photo diode receive as described with reference to FIGS. 2 and 3. As shown in FIG. 5, the internal phase comparison signal Di is obtained by comparing phases of summed signals a2+c2 and b2+d2 of signals that the internal light-receiving units receive.

Figure 6:
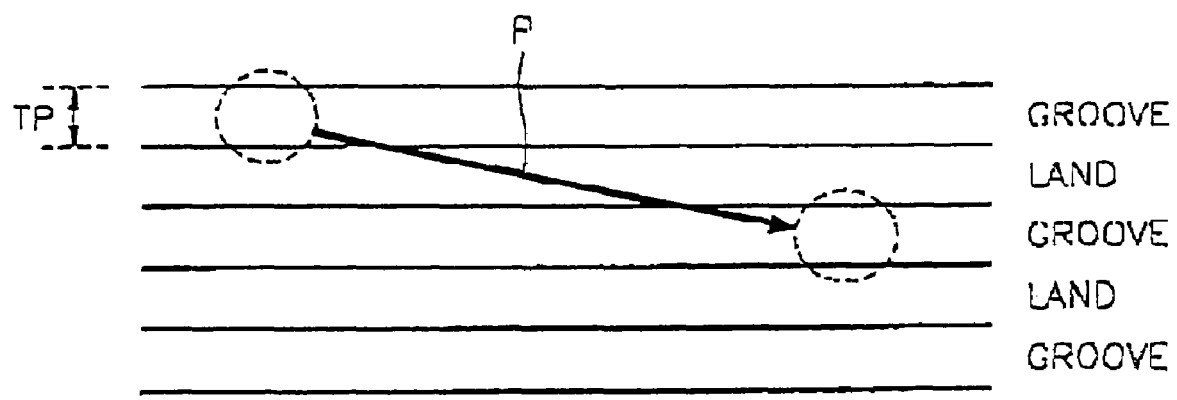
FIG. 6 is a view illustrating a path through which a laser beam crosses a track.

FIG. 6 is a view explaining a path through which a laser beam crosses a track. When the pickup unit 1 crosses a track formed in the disc 100, the laser beam travels along a path P shown in FIG. 6. Since the disc 100 rotates, the path P is inclined not perpendicular to the track.

Figure 7:
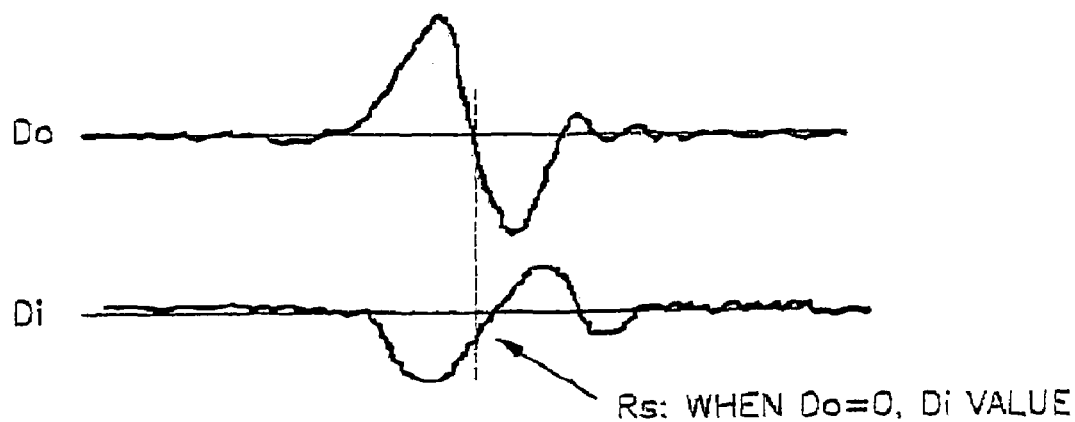
FIG. 7 is a view showing an internal phase comparison signal Di and an external phase comparison signal Do produced by a phase comparator.

FIG. 7 is a view showing the internal phase comparison signal Di and the external phase comparison signal Do produced by the phase comparator 22, with an example wavelength of a laser beam of 405 nm, numerical aperture (NA) of 0.85, and the track pitch (TP) of 0.32. Hereinafter, graphs are provided under the similar example conditions for ease of illustration in explaining an aspect of the invention, but in no way to limit possible wavelengths or number of signals that may be compared.

When the pickup unit 1 follows the track, the internal and external phase comparison signals Di and Do have values close to zero. However, when the pickup unit 1 travels along the path shown in FIG. 6, i.e., when the pickup unit 1 crosses a track, the internal and external phase comparison signals Di and Do describe substantially cosine and sine curves, respectively. When the pickup unit 1 crosses the track, the internal and external phase comparison signals Di and Do have opposite phases. A level value of the external phase comparison signal Do becomes zero when passing a ½ track pitch. However, a point of time that a actual level value of the external phase comparison signal Do becomes zero is not necessarily equal to a point of time that the external phase comparison signal Do passes a ½ track pitch. An error may occur between the points of time due to noise and when the level value of the external phase comparison signal Do becomes zero, a level value of the internal phase comparison signal will have a value that is not zero. This value is termed an Rs value.

Figure 8:
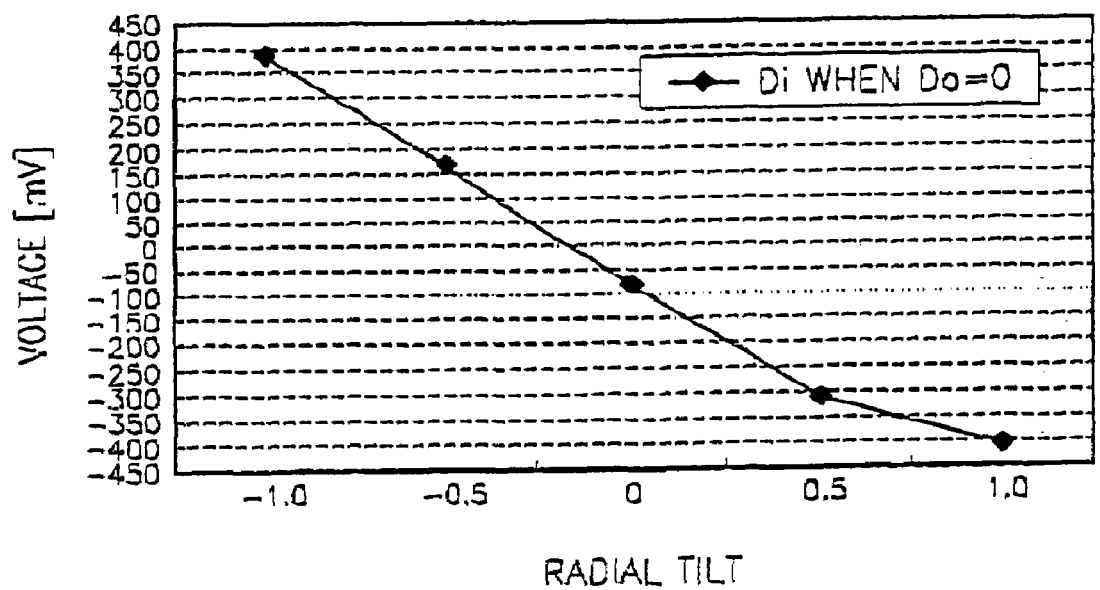
FIG. 8 is a graph showing the relationship between an Rs value and radial tilt.

FIG. 8 is a graph showing a relationship between the Rs value and the radial tilt. Referring to FIG. 8, it can be seen that the absolute magnitude of an Rs value is substantially inversely proportional to the radial tilt. In other words, the radial tilt is given by equation 1, where k is a proportional constant:

$$\text{Radial Tilt} = k * Rs \tag{1}$$

FIGS. 9A-9D and 10A-10B are graphs showing example relationships between various conditions and the Rs value. Here, the average Rs value is an average obtained by measuring an Rs value five times.

Figure 9A:
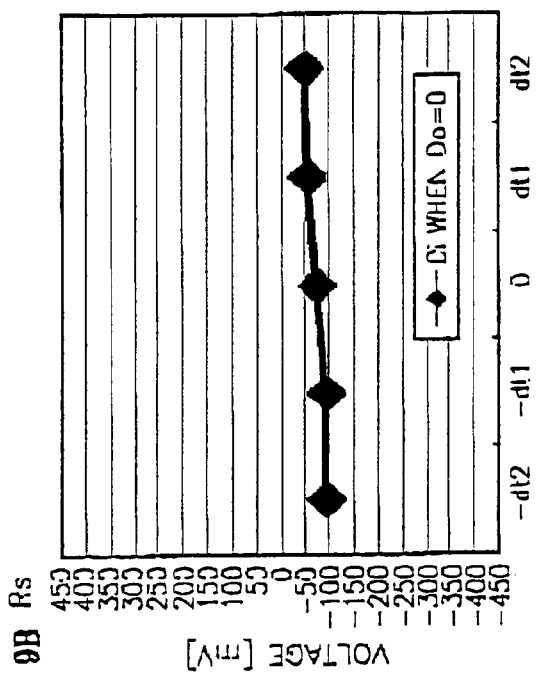
FIGS. 9A-9D and 10A-10B are graphs showing the relationship between various conditions and the Rs value.

FIG. 9A shows the relationship between detrack and the Rs value. The detrack value indicates whether the pickup unit 1 follows a track, i.e. whether the laser beam spot deviates from the center of the track. A zero value indicates that the laser beam spot is located in the center of the track. Values of ±d1, ±d2, or ±d3 represent the deviation ranges of the laser beam spot from the track center, and as the value increases, the deviation range increases. For example, a detrack pitch of 10% represents that the laser beam spot deviates from the track center by 10% of the track pitch. In FIG. 9A, it can be seen that the Rs value is not substantially affected by variations of detrack.

Figure 9B:
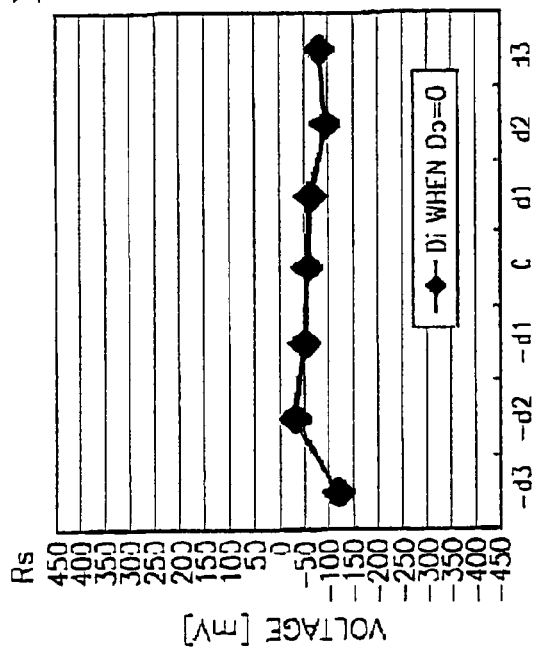

FIG. 9B shows the relationship between defocus and the Rs value. The defocus value indicates an amount the focus of the laser beam of the pickup unit 1 is defocused. A zero value indicates that the laser beam is precisely focused. Values of ±df1, ±df2, or ±df3 represent the defocusing range of the laser beam, and the magnitude increases, as the defocusing range increases. In FIG. 9B, it can be seen that the Rs value is also not substantially affected by the defocus magnitude.

Figure 9C:
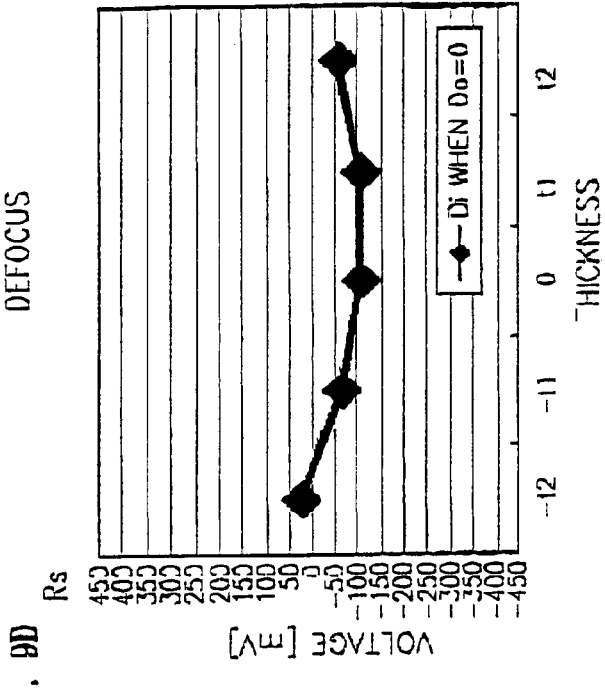

FIG. 9C shows the relationship between tangential tilt and the Rs value. In FIG. 9C, it can be seen that the Rs value is also not substantially affected by the magnitude of tangential tilt.

Figure 9D:
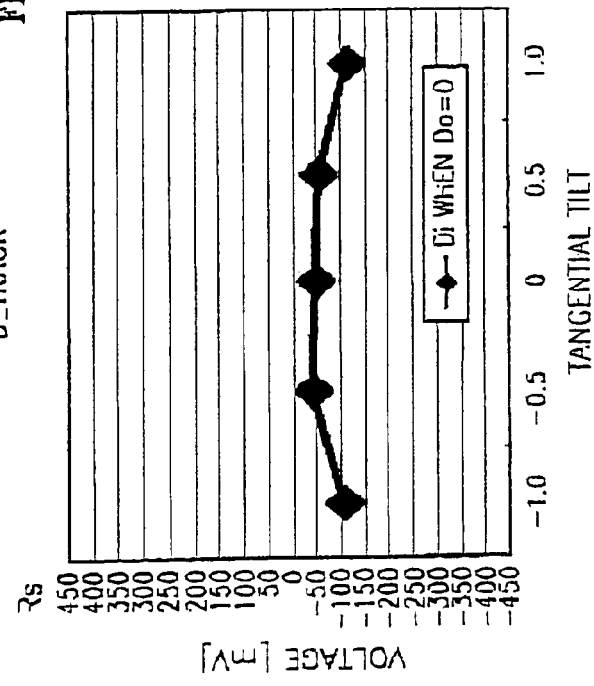

FIG. 9D shows the relationship between the thickness of the disc and the Rs value. Values of zero, ±t1, ±t2, and ±t3 represent the thickness of the disc with a larger value representing a thicker disc. In FIG. 9D, it can be seen that the Rs value is also not substantially affected by the thickness of a disc.

Figure 10B:
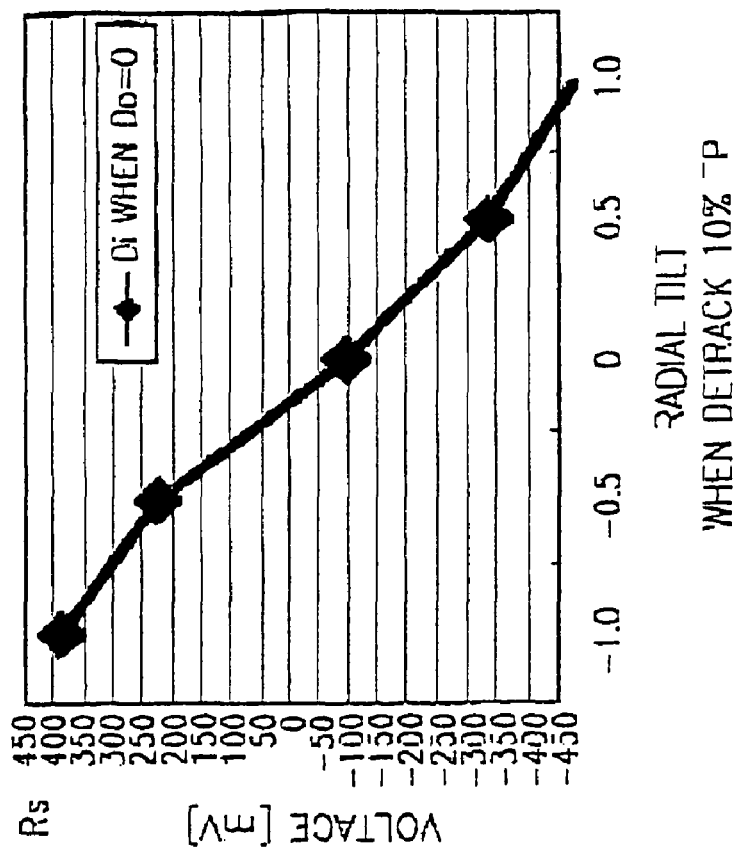
Figure 10A:
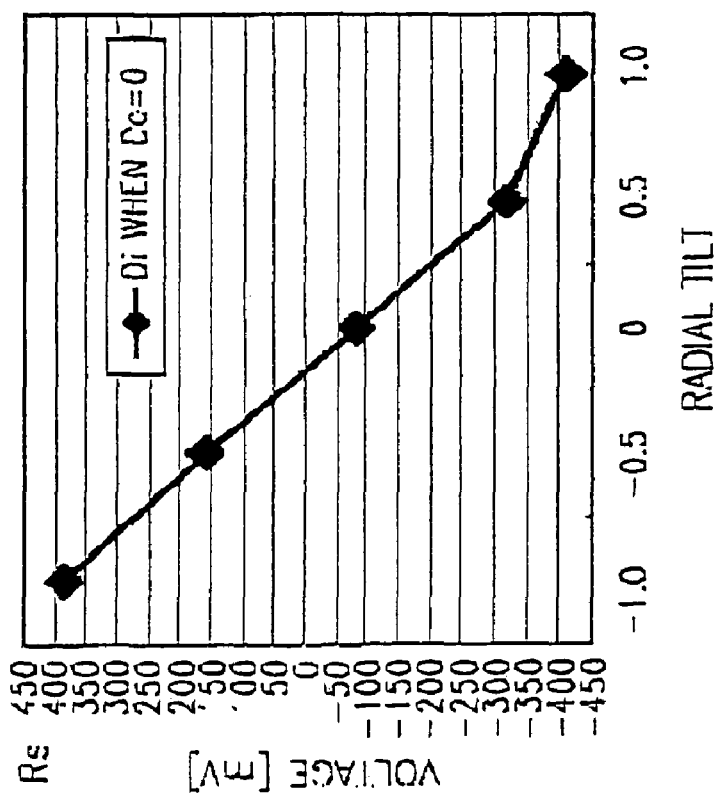

The example illustrated in FIG. 10A is substantially identical to the examples of FIG. 8 and FIG. 10B showing the relationship between the radial tilt and the Rs value with a detrack pitch of 10%. In FIG. 10B, it can be seen that although the detrack of 10% is present, the Rs value is substantially proportional to the radial tilt. Thus, although the laser beam deviates from the track, i.e., the pickup unit 1 does not follow the track, the radial tilt can still be obtained from the Rs value.

FIGS. 11A-11B show changes in the internal and external phase comparison signals Di and Do according to changes in a radial tilt value when the laser beam crosses a track.

FIG. 11A shows the internal and external phase comparison signals Di and Do obtained when the radial tilt value is −1.0 degree. When the level value of the external phase comparison signal Do is zero, the Rs value is positive. In other words, when the radial tilt value is −1.0 degree, the Rs value is positive.

FIG. 11B shows the internal and external phase comparison signals Di and Do obtained when the radial tilt is zero. When the level value of the external phase comparison signal Do is zero, the Rs value is also zero. In other words, when the radial tilt value is zero, the Rs value is also zero.

FIG. 11C shows the internal and external phase comparison signals Di and Do obtained when the radial tilt is +1.0 degree. When the level value of the external phase comparison value Do is zero, the Rs value is negative. In other words, when the radial tilt is +1.0 degree, the Rs value is negative.

FIGS. 12A-12C show the internal and external phase comparison signals Di and Do obtained according to the radial tilt when the laser beam repeatedly crosses the track without a tracking servo control.

FIG. 12A shows the internal and external phase comparison signals Di and Do obtained when the radial tilt value is −1.0 degree. When the radial tilt value is −1.0 degree, level values of upper and lower envelopes of the internal phase comparison signal Di are biased upward.

FIG. 12B shows the internal and external phase comparison values obtained when the radial tilt value is zero. When the radial tilt value is zero, the level values of upper and lower envelopes of the internal phase comparison signal Di are symmetrical with respect to zero.

FIG. 12C shows the internal and external phase comparison signals Di and Do obtained when the radial tilt value is +1.0 degree. When the radial tilt value is +1.0 degree, the level values of upper and lower envelopes of the internal phase comparison signal Di are biased downward.

When the graphs of FIGS. 12A-12C are enlarged and the level value of the external phase comparison signal Do is zero, the Rs value may be obtained as described with reference to FIGS. 11A-11C. However, in FIGS. 12A-12C, it can be seen that the radial tilt can be calculated based on the characteristics shown in the graphs when the laser beam repeatedly crosses the track without the tracking servo control and the bias of the level values of the upper and lower envelopes of the internal phase comparison signal Di. The radial tilt can be detected by measuring changes in a peak-to-peak value or a central value (the middle value of the peak-to-peak value) of the internal phase comparison signal Di and determining a proportional constant based on the measured changes.

After the tilt detector 22 detects the radial tilt, the drive 2 may generate a compensation signal based on the detected radial tilt and perform a servo control.

A method of detecting the radial tilt according one aspect of the present invention will now be described based on the above-described structure.

Figure 13:
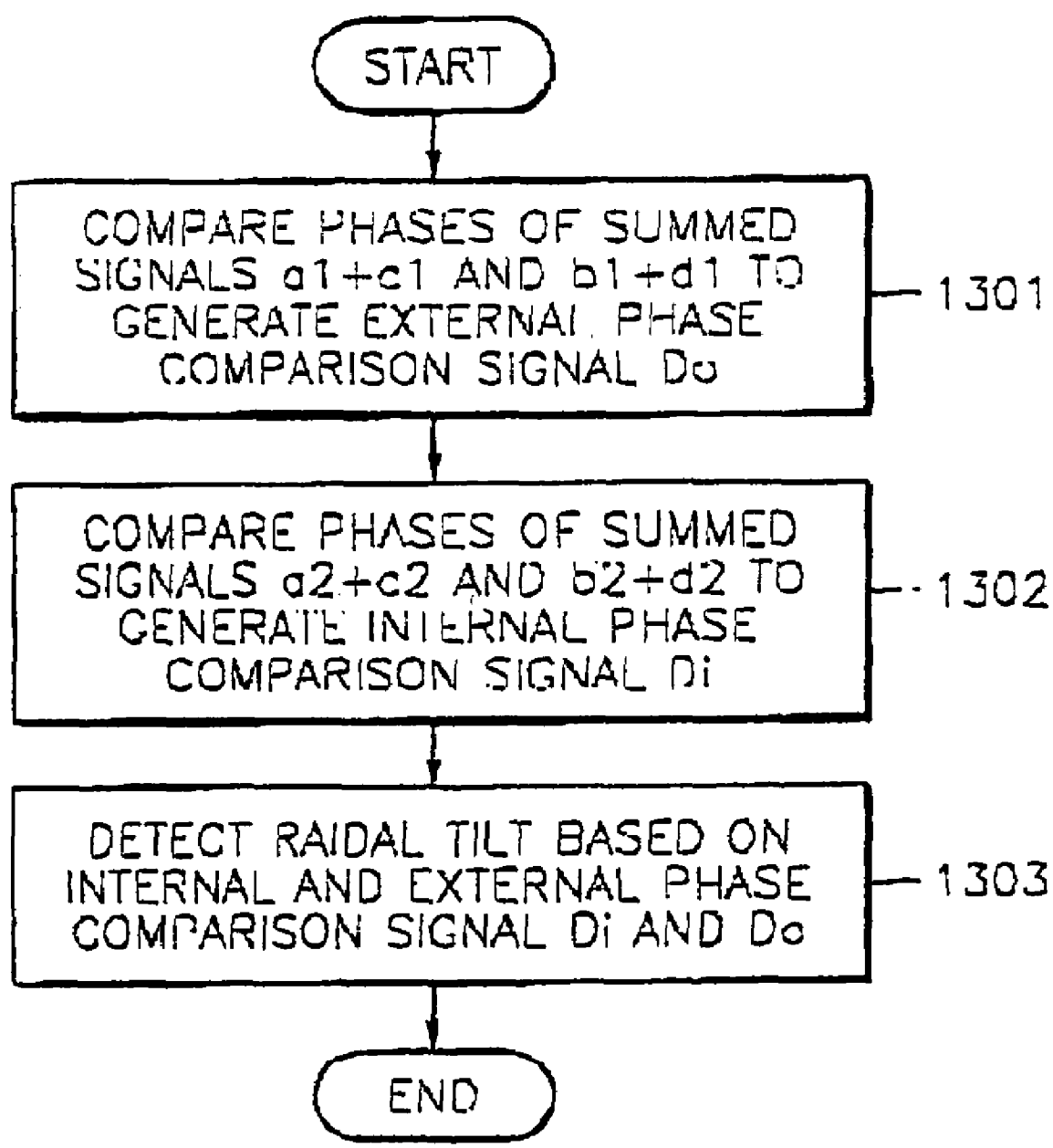
FIG. 13 is a flowchart explaining a method of detecting the radial tilt according to an aspect of the invention.

FIG. 13 is a flowchart explaining a method of detecting the radial tilt according to one aspect of the present invention. Referring to FIG. 13, in operation 1301, phases of the summed signals a1+c1 and b1+d1 obtained from signals a1, b1, c1, and d1 that the external light-receiving units of the octant photo diode receive, are compared to generate the external phase comparison signal Do. In operation 1302, the phases of the summed signals a2+c2 and b2+d2 obtained from signals a2, b2, c2, and d2, that the internal light-receiving units of the octant photo diode receive, are compared to generate the internal phase comparison signal Di. In operation 1303, the radial tilt is detected based on the internal and external phase comparison signals Di and Do obtained when a laser beam crosses a track formed in a disc 100. Operation 1303 can be realized by reading the level value Rs of the internal phase comparison signal Di when the level value of the external phase comparison signal Di is zero, multiplying the read Rs value by the proportional constant k, and calculating the radial tilt.

According to other aspects of the present invention, the previously described disc drive 2 may be mounted in disc recording/reproducing apparatuses such as computers, DVD players, and the like. Thus, when recording/reproducing data connected on/from the disc, the performance of the disc recording/reproducing apparatuses can be improved.

As described above, according to aspects of the present invention, methods of, and apparatus for, detecting the radial tilt based on the internal and external phase comparison signals Di and Do obtained when the laser beam crosses the track are described. The Rs value may be used as a reference value for detecting the radial tilt according to the present invention, as the Rs value is not substantially affected by other conditions detrack, defocus, the thickness of the disc, and tangential tilt, and is substantially proportional to the radial tilt. Thus, the the radial tilt may be accurately detected. In particular, since the Rs value is proportional to the radial tilt even when a detrack is present, the characteristics of the radial tilt may be accurately determined.

According to another aspect of the invention, the servo controller includes a computer implementing the method in FIG. 13 using data encoded on a computer readable medium.

Although a few embodiments of the present invention have been particularly shown and described, it would be appreciated by those skilled in the art that changes may be made therein in these embodiments without departing from the principles and spirit of the invention, the scope of which is defined in the claims and their equivalents.

What is claimed is:

1. A method of detecting a radial tilt of a disc, the method comprising:
   comparing phases of first summed signals obtained from a first plurality of signals that are generated when first light-receiving units of a photo diode receive light from a laser beam that is reflected from a surface of the disc to generate first phase comparison signal;
   comparing phases of second summed signals obtained from a second plurality of signals that are generated when second light-receiving units of the photo diode receive light from the laser beam that is reflected from the surface of the disc to generate a second phase comparison signal; and
   detecting the radial tilt based on a phase difference of the second and first phase comparison signals by reading a level value of the second phase comparison signal when a level value of the first phase comparison signal is substantially zero, wherein the zeroing of the level value of the first phase comparison signal occurs when the laser beam crosses a point signifying a ½ track pitch of a track on the disc.

2. The method of claim 1, wherein the detecting of the radial tilt comprises multiplying the read value by a proportional constant.

3. The method of claim 1, wherein the second and first light-receiving units are substantially rectangular, two sides of light-receiving surfaces of the second light-receiving units and two sides of light-receiving surfaces of the first light-receiving units disposed in a track direction of the disc are substantially identical, and the other two sides of the light-receiving surfaces of the first light-receiving units disposed to be substantially perpendicular to the track direction of the disc are longer than the other two sides of the light-receiving surfaces of the second light-receiving units disposed to be substantially perpendicular to the track direction of the disc.

4. The method of claim 1, wherein the second plurality of signals that second light-receiving units receive to generate the second phase comparison signal are portions of $-1^{st}$-order and $1^{st}$-order beams of light.

5. The method of claim 4, wherein the first plurality of signals the first light-receiving units receive to generate the first phase comparison signal are a $0^{th}$-order beam of light and one of $-1^{st}$-order and $1^{st}$-order beams of light.

6. An apparatus detecting a radial tilt of a disc, the apparatus comprising:
   a pickup unit in which an octant photo diode is mounted;
   a phase comparator comparing phases of first summed signals obtained from a first plurality of signals that are generated when first light-receiving units of the octant photo diode receive light from a laser beam that is reflected from a surface of the disc so as to generate an first phase comparison signal, and comparing phases of second summed signals obtained from a second plurality of signals that are generated when second light-receiving units of the octant photo diode receive light from the laser beam that is reflected from the surface of the disc so as to generate a second phase comparison signal; and
   a tilt detector detecting the radial tilt based on a phase difference of the second and first phase comparison signals by reading a level value of the second phase comparison signal when a level value of the first phase comparison signal is substantially zero, wherein the zeroing of the level value of the first phase comparison signal occurs when the laser beam crosses a point signifying a ½ track pitch of a track on the disc.

7. The apparatus of claim 6, wherein the tilt detector multiplies the read value Rs by a proportional constant calculating a radial tilt value.

8. The apparatus of claim 6, wherein the second and first light-receiving units are substantially rectangular, two sides of light-receiving surfaces of the second light-receiving units and two sides of light-receiving surfaces of the first light-receiving units disposed in a track direction of the disc are substantially identical, and the other two sides of the light-receiving surfaces of the first light-receiving units that are disposed to be substantially perpendicular to the track direction of the disc are longer than the other two sides of the light-receiving surfaces of the second light-receiving units that are disposed to be substantially perpendicular to the track direction of the disc.

9. The apparatus of claim 6, wherein the second plurality of signals the second light-receiving units receive to generate the second phase comparison signal are portions of $-1^{st}$-order and $1^{st}$-order beams of light.

10. The apparatus of claim 9, wherein the first plurality of signals that first light-receiving units receive to generate the first phase comparison signal are a $0^{th}$-order beam of light and one of $-1^{st}$-order and $1^{st}$-order beams of light.

11. A disc drive apparatus to drive and control tilt of a disc, comprising:
   a drive unit to rotate the disc;
   a pickup unit in which an octant photo diode is mounted;
   a focusing and seek servo control system to move a laser beam spot to a target track on the disc;
   a rotating servo control system to control the rotation of the disc;
   a tracking servo control system to move the laser beam spot to follow the target track during the rotation of the disc; and
   a tilt detector unit, wherein the tilt detector unit comprises:
      a phase comparator comparing phases of first summed signals obtained from a first plurality of signals that are generated when first light-receiving units of the octant photo diode receive light from a laser beam that is reflected from a surface of the disc so as to generate an first phase comparison signal, and comparing phases of second summed signals obtained from a second plurality of signals that are generated when second light-receiving units of the octant photo diode receive light from the laser beam that is reflected from the surface of the disc so as to generate an second phase comparison signal; and
      a tilt detector detecting the radial tilt based on a phase difference of the second and first phase comparison signals by reading a level value of the second phase comparison signal when a level value of the first phase comparison signal is substantially zero, wherein the zeroing of the level value of the first phase comparison signal occurs when the laser beam crosses a point signifying a ½ track pitch of a track on the disc.

12. A disc recording/reproducing apparatus, comprising:
   at least one of a recording part to record data on a disc and a reproducing part to reproduce data that had been recorded on a disv
   a mounting fixture to mount a disc drive;

a connector to provide a path for the data from the mounted disc to the at least one of recording part and reproducing part; and a disc drive mounted in the mounting fixture, wherein the disc drive comprises:

a drive unit to rotate the disc;

a pickup unit in which an octant photo diode is mounted;

a focusing and seek servo control system to move a laser beam spot to a target track on the disc;

a rotating servo control system to control the rotation of the disc;

a tracking servo control system to move the laser beam spot to follow the target track during the rotation of the disc; and a tilt detector unit, wherein the tilt detector unit comprises:

a phase comparator comparing phases of first summed signals obtained from a first plurality of signals that are generated when first light-receiving units of the octant photo diode receive light from a laser beam that is reflected from a surface of the disc so as to generate an first phase comparison signal, and comparing phases of second summed signals obtained from a second plurality of signals that are generated when second light-receiving units of the octant photo diode receive light from the laser beam that is reflected from the surface of the disc so as to generate an second phase comparison signal; and a tilt detector detecting the radial tilt based on a phase difference of the second and first phase comparison signals by reading a level value of the second phase comparison signal when a level value of the first phase comparison signal is substantially zero, wherein the zeroing of the level value of the first phase comparison signal occurs when the laser beam crosses a point signifying a ½ track pitch of a track on the disc.

13. A method of detecting a radial tilt of a disc, comprising:

summing a plurality of signals received when a laser beam crosses a track on the disc, the signals being generated by a reception of light of the laser beam reflected from the surface of the disc;

comparing phases of the summed signals; and analyzing the compared phases and detecting a tilt based on the analysis of the compared phases, the detecting of the tilt comprising reading a level value of the second phase comparison signal when a level value of the first phase comparison signal is substantially zero, wherein the zeroing of the level value of the first phase comparison signal occurs when the laser beam crosses a point signifying a ½ track pitch of a track on the disc.

14. A tilt detecting apparatus to detect a tilt of a disc, comprising:

a photodiode with a plurality of sectors to generate signals in accordance with a reception of light from a laser beam being reflected from a surface of the disc at each sector;

a phase comparator comparing phases of the signals generated by the plurality of sectors of the photodiode; and a tilt detector analyzing the compared phases of signals by reading a level value of the second phase comparison signal when a level value of the first phase comparison signal is substantially zero, wherein the zeroing of the level value of the first phase comparison signal occurs when the laser beam crosses a point signifying a ½ track pitch of a track on the disc.

15. A computer readable medium encoded with processing instructions implementing a method of detecting a radial tilt of a disc, the method comprising:

comparing phases of first summed signals obtained from a first plurality of signals that are generated when first light-receiving units of a photo diode receive light from a laser beam that is reflected from a surface of the disc to generate an first phase comparison signal;

comparing phases of second summed signals obtained from a second plurality of signals that are generated when second light-receiving units of the photo diode receive light from the laser beam that is reflected from the surface of the disc to generate an second phase comparison signal; and detecting the radial tilt based on a phase difference of the second and first phase comparison signals by reading a level value of the second phase comparison signal when a level value of the first phase comparison signal is substantially zero, wherein the zeroing of the level value of the first phase comparison signal occurs when the laser beam crosses a point signifying a ½ track pitch of a track on the disc.

16. The computer readable medium as set forth in claim 15, wherein the method of detecting the radial tilt comprises multiplying the read value by a proportional constant.

17. The method of claim 1, wherein the detecting of the radial tilt comprises detecting the radial tilt when the laser beam crosses the track on the disc without tracking control.

18. The method of claim 1, wherein the laser beam travels in a radial direction across the surface of the disc.

* * * * *

UNITED STATES PATENT AND TRADEMARK OFFICE
CERTIFICATE OF CORRECTION

PATENT NO. : 7,349,311 B2 Page 1 of 1
APPLICATION NO. : 10/617256
DATED : March 25, 2008
INVENTOR(S) : Byung-in Ma et al.

It is certified that error appears in the above-identified patent and that said Letters Patent is hereby corrected as shown below:

Column 8, line 66, claim 12 change "disv" to --disc;--.

Signed and Sealed this

Seventeenth Day of June, 2008

JON W. DUDAS
*Director of the United States Patent and Trademark Office*